United States Patent
Moore

(10) Patent No.: US 7,971,689 B2
(45) Date of Patent: Jul. 5, 2011

(54) HYDRAULIC CALIPER BRAKE ASSEMBLY FOR A BICYCLE

(76) Inventor: Wayne-Ian Moore, Changhua (TW)

(*) Notice: Subject to any disclaimer, the term of this patent is extended or adjusted under 35 U.S.C. 154(b) by 728 days.

(21) Appl. No.: 12/057,384

(22) Filed: Mar. 28, 2008

(65) Prior Publication Data

US 2009/0242334 A1    Oct. 1, 2009

(51) Int. Cl.
*F16D 55/18* (2006.01)
(52) U.S. Cl. ........ 188/72.4; 188/72.5; 188/26; 188/370; 188/106 P
(58) Field of Classification Search .............. 188/72.4, 188/72.5, 26, 370, 106 P, 24.22
See application file for complete search history.

(56) References Cited

U.S. PATENT DOCUMENTS

| | | | | |
|---|---|---|---|---|
| 2,961,074 A | * | 11/1960 | Oswalt | 188/78 |
| 3,033,325 A | * | 5/1962 | Tjernstrom | 188/170 |
| 3,297,115 A | * | 1/1967 | Waloen et al. | 188/170 |
| 3,581,849 A | * | 6/1971 | Landgraf | 188/196 A |
| 3,645,362 A | * | 2/1972 | Scheibe | 188/71.8 |
| 4,412,603 A | * | 11/1983 | Bischoff | 188/106 P |
| 4,428,462 A | * | 1/1984 | Warwick et al. | 188/72.4 |
| 4,496,033 A | * | 1/1985 | Hall et al. | 188/347 |
| 5,209,154 A | * | 5/1993 | Black | 91/519 |
| 5,485,902 A | * | 1/1996 | Berwanger | 188/196 A |
| 5,752,588 A | * | 5/1998 | Reichert et al. | 188/77 R |
| 5,954,162 A | * | 9/1999 | Feigel et al. | 188/72.6 |
| 6,585,088 B1 | * | 7/2003 | Fontaine et al. | 188/170 |
| 6,837,342 B1 | * | 1/2005 | Olschewski et al. | 188/72.8 |
| 7,344,199 B2 | * | 3/2008 | Meyer | 303/10 |
| 2006/0185360 A1 | * | 8/2006 | Takizawa et al. | 60/547.1 |

* cited by examiner

*Primary Examiner* — Robert Siconolfi
*Assistant Examiner* — James K Hsiao

(57) ABSTRACT

A hydraulic caliper brake assembly for a bicycle comprises a caliper body; a first chamber installed in the caliper body; a first piston installed in the first chamber; a second piston installed in the first chamber; an inner chamber formed between the first piston and the second piston for receiving brake oil; an outer chamber installed between the second piston and the caliper body for receiving brake oil; and an outer valve installed in the second piston for switching flowing of the brake oil between the inner chamber and outer chamber. When a small force is applied, the brake oil will flow into the inner chamber; by closing the outer valve, the first piston is pushed to have the effect of speed reduction; when the braking force is increased, by opening the outer valve, the second piston is pushed to have the effect of emergent braking.

9 Claims, 5 Drawing Sheets

HYDRAULIC CALIPER BRAKE ASSEMBLY FOR A BICYCLE

FIELD OF THE INVENTION

The present invention relates to bicycle parts, and particularly to a hydraulic caliper brake assembly for a bicycle which has a simple oil circuit that permits two stages of braking force with a better heat dissipation effect. Furthermore, the hydraulic pressure to switch between those two stages is adjustable so that the speed reduction stage and emergency braking stage are divided in the present invention.

BACKGROUND OF THE INVENTION

A brake is an important safety device for a bicycle. The brake uses friction force to achieve the effect of speed reduction. In the brake system, by Pascal principle, brake oil serves to transfer the brake force from the brake lever to a hydraulic pressure caliper to push the piston and the brake pads so as to compress the brake disk to have the effect of braking. The hydraulic pressure brake system has the following advantages: 1. The function of the brake is not so affected by weather, environment, or temperature, however the V brake is deeply affected by rain, earth, or temperature; 2. The brake pad has a longer lifetime; 3. Only a small hand force for braking is necessary. In moving along a downward path, user will feel easy; 4. The wheel rim will not wear; 5. The tire will not be damaged by heat generated by the braking force. Thus the hydraulic pressure brake system is widely used in the bicycles. However it still has the problem that a greater braking force is provided so that it is possible to over brake such that the rider can be thrown over the front wheel or the wheels are locked such that the rider losses control, potentially leading to serious injury. Additional due to heat generated during prolonged braking, i.e. holding the bike at constant speed during a long hill descent, the oil tends to expand leading brake drag issues once the brake lever has been released. In the worst case this heat can vaporize the oil leading to a total loss of braking.

Referring to U.S. Pat. No. 6,435,318, "a two-stage bicycle disk brake assembly with an anti-lock device" is disclosed, in that a bicycle disk brake assembly is provided, which includes a pressure-reducing cylinder attached to a caliper body and formed with an inner chamber and outer chamber. Upon application of an external pressure to a hydraulic fluid, which is filled within a fluid reservoir in the caliper body, the fluid flows from the reservoir to the outer chamber. When the fluid pressure in the outer chamber reaches a first value, an inner check valve is operated so as to permit flow of the fluid from the outer chamber to the inner chamber. Thereafter, when the fluid pressure in the inner chamber reaches a second value and when the external pressure is released, a resilient member biases the fluid in the inner chamber to activate an outer check valve, thereby permitting flow of the fluid from the inner chamber to the outer chamber and subsequently to the reservoir. The pressure reduction cylinder indeed offers an improvement over prior art, but has a couple of drawbacks: 1. Dead point where the rider wants more power but only displaces the inner relief piston. 2. The hydraulic pressure for opening the check valve is un-adjustable and can not match the requirement of various environments or riders preference. 3. It doesn't address the problem of heat dissipation. 4. Also due to the relative large size of the piston the initial brake forces are still high. 5. The max braking force is limited somewhat to the size/mass of the system as it is governed by bore size of the piston, i.e. if you want more braking power the size of the piston will need to increase and thus so will the mass/size of the system.

SUMMARY OF THE INVENTION

Accordingly, the object of the present invention is to provide a hydraulic caliper brake assembly for a bicycle having a simple oil circuit with a better heat dissipation effect. Furthermore, the hydraulic pressure is adjustable and the speed reduction stage and emergency braking stage are divided in the present invention and there is no dead travel "lost motion" where the rider displaces the lever further with no subsequent increase in the braking force. Additionally a bigger braking force can be achieved without increasing the piston bore size and therefore the size/mass of the system.

To achieve above object, the present invention provides a hydraulic caliper brake assembly for a bicycle comprising: a caliper body; a first chamber installed in the caliper body; a first piston installed in the first chamber; a second piston installed in the first chamber; an inner chamber formed between the first piston and the second piston for receiving brake oil; an outer chamber installed between the second piston and the caliper body for receiving brake oil; and an outer valve installed in the second piston 30 for switching flowing of the brake oil between the inner chamber and outer chamber; the outer valve being installed with a spring; one end of the spring; resisting against the outer valve; and another end thereof resisting against an adjusting screw; by rotating the adjusting screw, the opening and closing of the outer valve being controllable; an inner valve installed in the second piston for controlling the flow of the brake oil between the inner chamber and the outer chamber, in normal state, the outer valve is closed, when oil pressure in the outer chamber is greater than the pressure of the inner chamber, the inner valve will open and the brake oil will return to the inner chamber from the outer chamber.

When a small force is applied, the brake oil will flow into the inner chamber; by closing the outer valve; brake oil can not flow into the outer chamber so that the first piston is pushed to have the effect of speed reduction; when the braking force is increased, by opening the outer valve, brake oil will flow to the outer chamber to push the second piston to have the effect of emergent braking. When the brake is released, the hydraulic pressure in the outer chamber is greater than that of the inner chamber, the inner valve is opened, and the brake oil will flow into the inner chamber from the outer chamber to return to the original state. By controlling braking force, the barking operation is divided into a speed reduction stage and a stop stage so that the braking operation is steady and tolerable. The point at which the switch takes place between the two stages is controllable by controlling the adjusting screw.

Moreover, two outer oil tubes are installed at an outer side of the caliper body for communicating the first chamber and the second chamber corresponding to the first chamber. Not only controlling the actions at two sides at the same time, by installation of the outer oil tubes, the inner oil circuit in the caliper body can be simplified and more importantly can better dissipate the heat in the fluid. Also as when only the small piston is used it creates an air cooling effect as the surface of the brake pad is clear of the bigger piston. Additionally when comparing to a conventional brake system with the same sized main bore the max braking force of the system is increased in the emergency braking stage as the total piston area is equal to the small piston area plus the big piston area.

Hence you can have the benefit of higher braking performance but in the same space/envelope of prior art.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
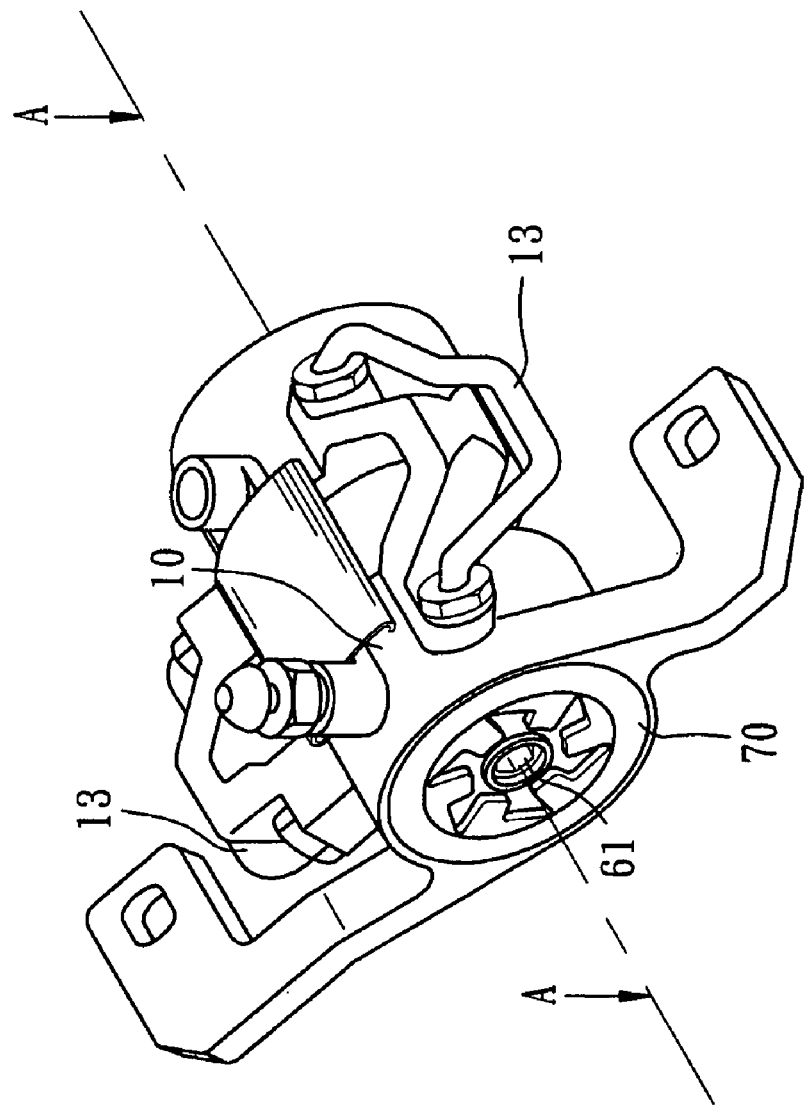
FIG. 1 is a schematic perspective view of the hydraulic caliper brake assembly for a bicycle of the present invention.
Figure 2:
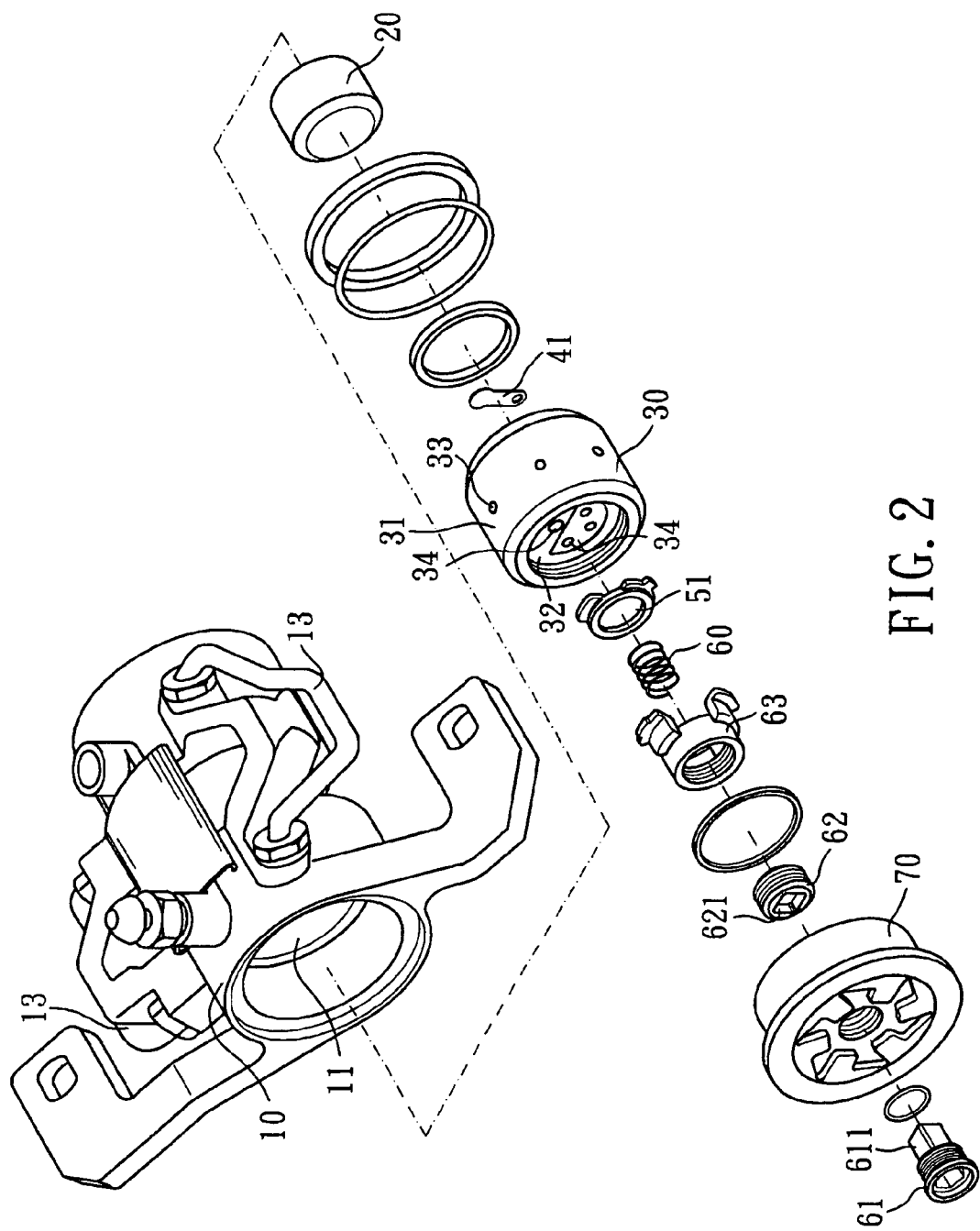
FIG. 2 is an explosive schematic view of the hydraulic caliper brake assembly for a bicycle of the present invention.

With referring to FIGS. 1 and 2, a hydraulic caliper brake assembly for a bicycle according to the present invention is illustrated. The present invention has the following elements.

A caliper body 10 is installed to a bicycle frame or a bi-forked assembly of a bicycle and is assembled to a brake pad (not shown) so as to brake the bicycle with the brake disk (not shown).

A first chamber 11 is installed in the caliper body 10.

A first piston 20 is installed in the first chamber 11 and has a round cylinder shape.

A second piston 30 is installed in the first chamber 11 and has a round cylinder shape. One end surface of the second piston 30 is recessed for receiving the first piston 20 coaxially. An outer diameter of the first piston 20 is smaller than that of the second piston 30. The first piston 20 provides a smaller braking force, while the second piston 30 provides a greater braking force. A lateral surface 31 of the second piston 30 has a plurality of oil channels 33. A bottom surface 32 of the second piston 30 is installed with three oil channels 34.

An inner chamber 40 (referring to FIG. 3) is between the first piston 20 and the second piston 30 for receiving braking oil. The inner chamber 40 is communicated to the oil channels 33 in the lateral surface 31 of the second piston 30.

An outer chamber 50 (referring to FIG. 3) is between the second piston 30 and the caliper body 10 for receiving braking oil. The outer chamber 50 is communicated to the inner chamber 40 through the oil channels 34 at the bottom surface 32 of the second piston 30.

An outer valve 51 is installed at the bottom surface 32 of the second piston 30. With the oil channels 34 at the bottom surface 32, the outer valve 51 serves to control the communication of the brake oil between the inner chamber 40 and the outer chamber 50. When pressure is greater at the inner chamber 40 compared to the outer chamber 50, the outer valve 51 is opened. Otherwise the outer valve 51 is closed.

An inner valve 41 is installed in the second piston 30 at a side opposite to the outer valve 51 for controlling the communication of the brake oil between the inner chamber 40 and the outer chamber 50. The inner valve 41 is a mono-directional valve which can be made by a reed. Generally, the inner valve 41 is closed. When the hydraulic pressure in the outer chamber 50 is greater than that of the inner chamber 40, the inner valve 41 will open to cause the brake oil flow into the inner chamber 40.

A spring 60 has one end resisting against the outer valve 51 and another end thereof resists against a second adjusting screw 62. The second adjusting screw 62 has a rectangular hole 621 which is engaged to a rectangular post 611 of a first adjust screw 61. An outer thread of the second adjusting screw 62 is engageable to an inner thread of a retaining seat 63. The retaining seat 63 is firmly installed to the second piston 30. By screwing the first adjust screw 61, the second adjusting screw 62 will interact to move inwards or outwards in the retainer seat so as to further compress the spring 60 to control the pressure for opening the outer valve 51.

An outer cover 70 is assembled to the caliper body 10 for tightly sealing the first chamber 11 on the one side of the caliper body 10. This allows the caliper body 10 to be forced in one piece and permits machining of the caliper chambers from one side. The first adjust screw 61 is screwed into the outer cover 70 for controlling the spring 60.

Two outer oil tubes 13 are installed at an outer surface of the caliper body 10 to communicate to the first chamber 11 and the second chamber 12 corresponding to the first chamber 11. The second chamber 12 is installed with a first piston 20 and a second piston 30 (referring to FIG. 3) and similarly is formed with an inner chamber 40 and an outer chamber 50. In detail, one outer oil tube 13 communicates the inner chamber 40 of the first chamber 11 and the inner chamber 40 of the second chamber 12. Another outer oil tube 13 communicates the outer chamber 50 of the first chamber 11 and the outer chamber 50 of the second chamber 12. The outer oil tubes 13 are made of material with good heat conductivity, such as copper or aluminum for having preferred heat dissipation effect.

Figure 3:
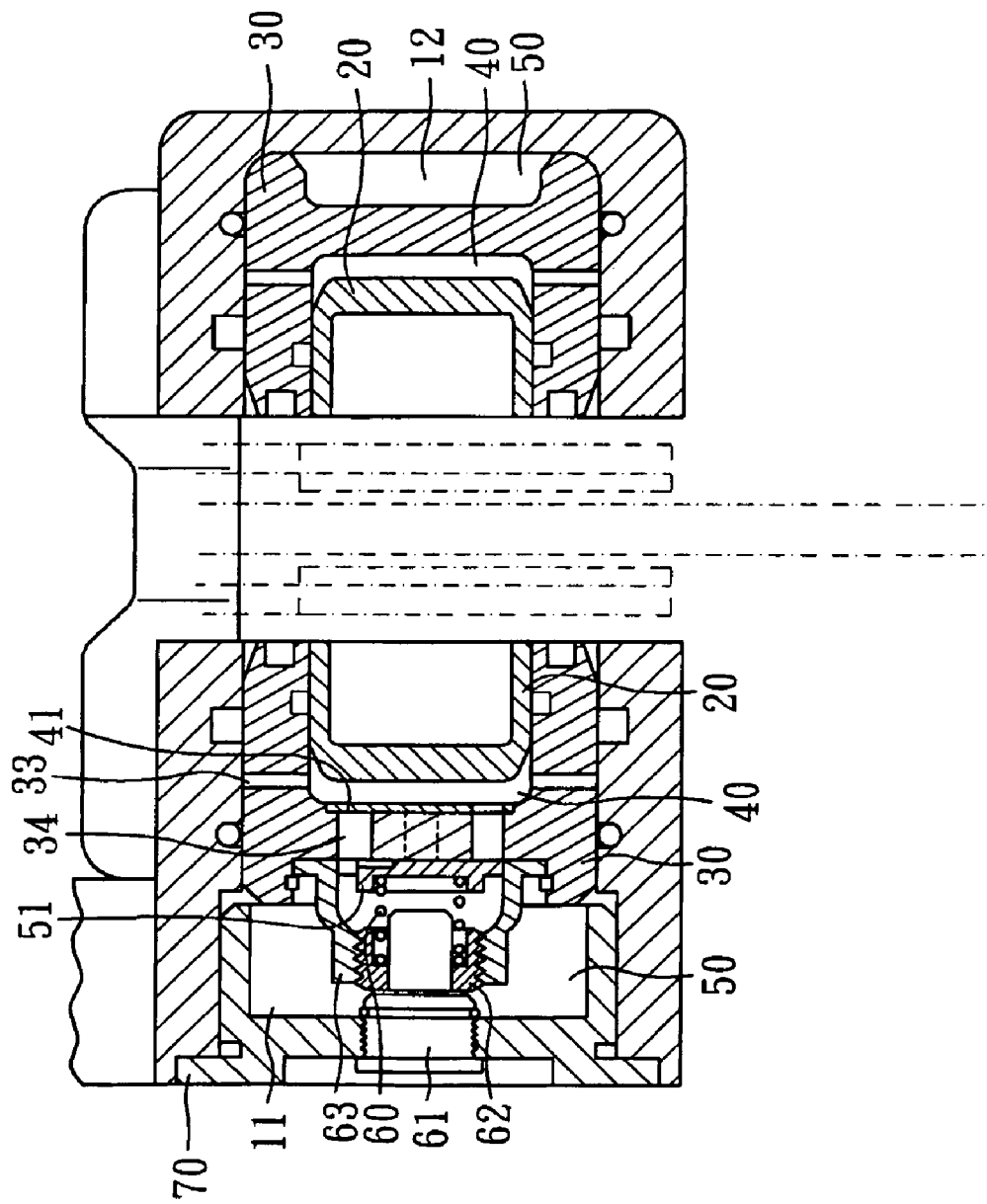
FIG. 3 is an assembled cross section view along line AA in FIG. 1.

With referring to FIG. 3, an initial state before braking is illustrated.

Figure 4:
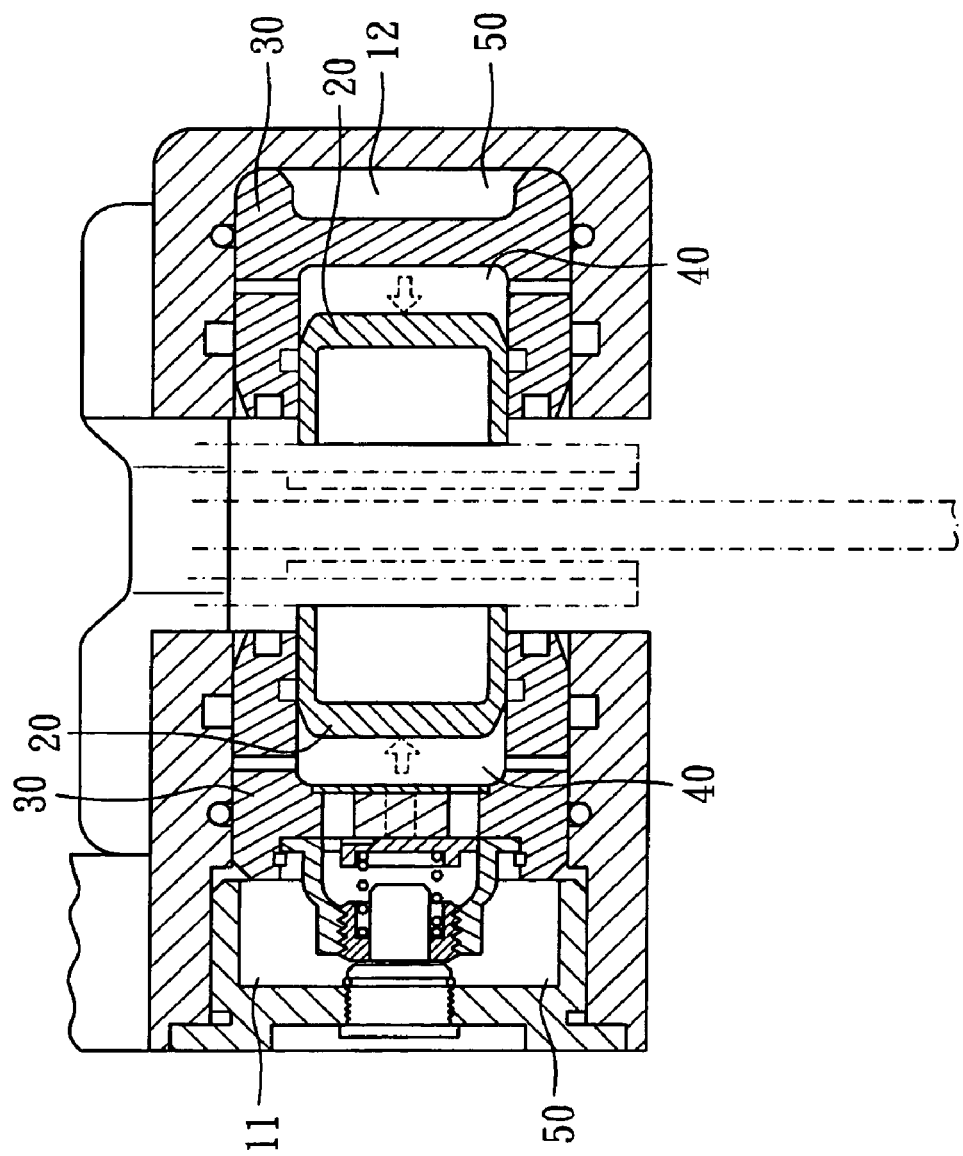
FIG. 4 is a schematic cross sectional view of FIG. 3 in a state of first stage braking.
Figure 5:
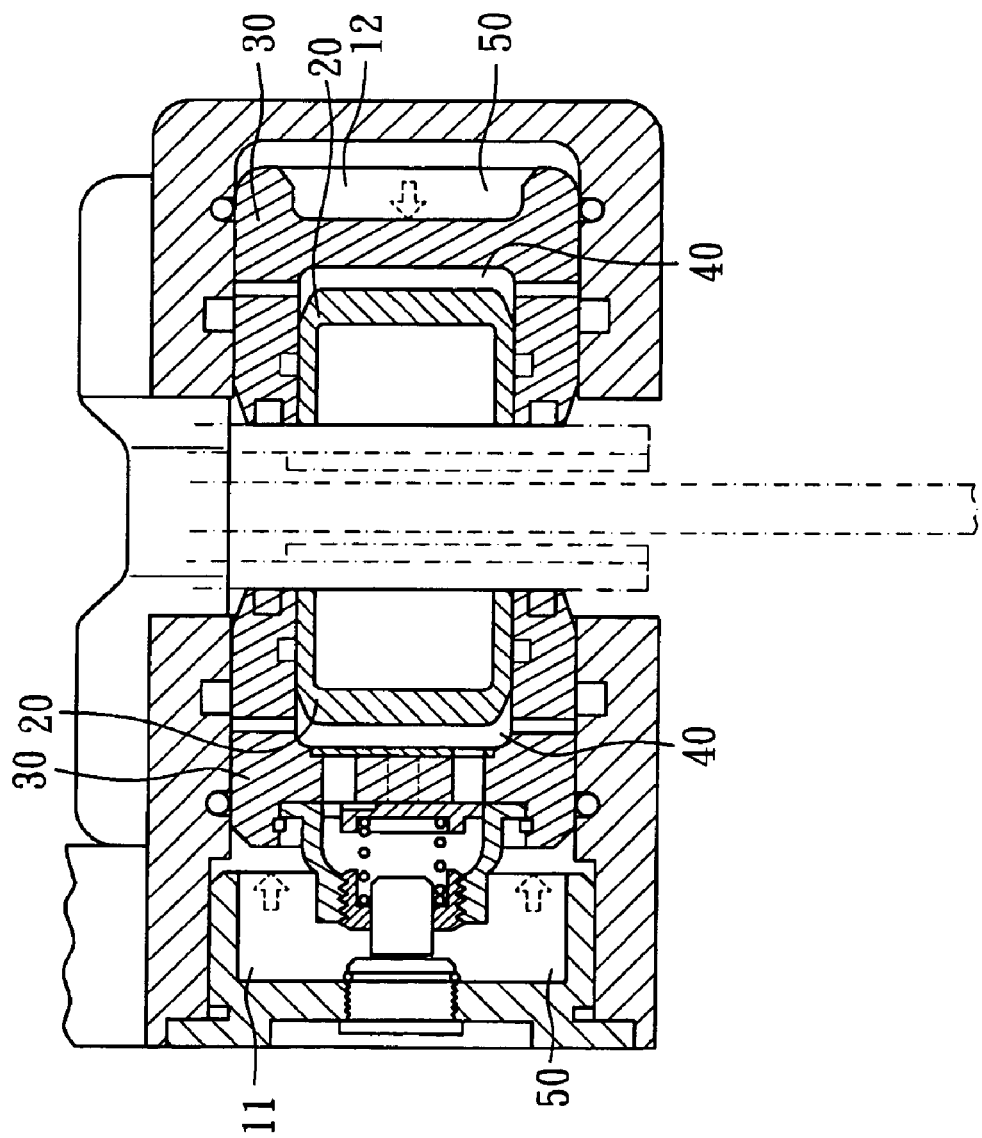
FIG. 5 is a schematic cross sectional view of FIG. 3 in a state of second stage braking.

See FIG. 4 when a small braking force is applied, the brake oil will flow into the inner chamber 40. The outer valve 51 and inner valve 41 of the first chamber 11 are closed. The brake oil can not flow into the outer chamber 50 further. The first piston 20 is pushed. Meanwhile, the brake oil will flow to the inner chamber 40 of the second chamber 12 through the outer oil tube 13. Similarly, the first piston 20 is pushed to have the effect of speed reduction. Referring to FIG. 5, when the braking force is incremented, the pressure of the inner chamber 40 of the first chamber 11 will be larger than the elastic force of the spring 60 and so open the outer valve 51. By opening the outer valve 51, the brake oil will flow into the outer chamber 50 to push the second piston 30. Similarly, brake oil flows to the outer chamber 50 of the second chamber 12 from another outer oil tube 13 to push the second piston 30 to achieve the object of emergent braking in second stage. When the brake is released, the hydraulic pressure of the outer chamber 50 is greater than the hydraulic pressure of the inner chamber 40 so the spring force will close the outer valve 51. Also the inner valve 41 will open. By opening the inner valve 41, brake oil will return to the inner chamber 40 through the outer chamber 50 to be at the original state.

The present invention is thus described; it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A hydraulic caliper brake assembly for a bicycle comprising:
   a caliper body;
   a first chamber installed in the caliper body;
   a first piston installed in the first chamber;
   a second piston installed in the first chamber;
   an inner chamber formed between the first piston and the second piston for receiving brake oil;
   an outer chamber installed between the second piston and the caliper body for receiving brake oil;
   an outer valve installed in the second piston for switching flowing of the brake oil between the inner chamber and outer chamber; and
   an inner valve installed in the second piston for controlling the flow of the brake oil between the inner chamber and the outer chamber, wherein in normal state, the outer valve is closed; when hydraulic pressure in the outer chamber is greater than the hydraulic pressure of the inner chamber, the inner valve will open and the brake oil will return to the inner chamber from the outer chamber;
   wherein when a small force is applied, the brake oil will flow into the inner chamber; by closing the outer valve; brake oil can not flow into the outer chamber so that the first piston is pushed to have the effect of speed reduction; when the braking force is increased, by opening the outer valve, brake oil will flow to the outer chamber to push the second piston to have the effect of emergent braking.

2. The hydraulic caliper brake assembly for a bicycle as claimed in claim 1, wherein the outer valve is installed with a spring; one end of the spring resists against the outer valve, and another end thereof resists against an adjusting screw, by rotating the adjusting screw, the opening force of the outer valve is controllable.

3. The hydraulic caliper brake assembly for a bicycle as claimed in claim 1, wherein the first piston is received in the second piston and an outer diameter of the first piston is smaller than that of the second piston.

4. The hydraulic caliper brake assembly for a bicycle as claimed in claim 1, wherein the caliper body is installed with at least one outer tube which serves to the first chamber and a second chamber corresponding to the first chamber.

5. The hydraulic caliper brake assembly for a bicycle as claimed in claim 4, wherein the outer tube is made of heat conductive material selected from copper and aluminum.

6. The hydraulic caliper brake assembly for a bicycle as claimed in claim 4, wherein the second chamber is further installed with a first piston and a second piston.

7. The hydraulic caliper brake assembly for a bicycle as claimed in claim 1, wherein the first piston and the second piston are installed coaxially.

8. The hydraulic caliper brake assembly for a bicycle as claimed in claim 1, wherein a lateral side of the second piston has a plurality of channels by which the brake oil flows into the inner chamber or flows out of the inner chamber.

9. The hydraulic caliper brake assembly for a bicycle as claimed in claim 1, wherein a bottom of the second piston is installed with a plurality of channels, with the outer valve, the flowing of the brake oil between the inner chamber and the outer chamber are controllable.

* * * * *